Sept. 5, 1961 R. J. TEITEL 2,999,060
CONTROL MEANS FOR A NUCLEAR REACTOR
Filed June 2, 1958 3 Sheets-Sheet 1

INVENTOR.
ROBERT J. TEITEL
BY

Sept. 5, 1961 R. J. TEITEL 2,999,060
CONTROL MEANS FOR A NUCLEAR REACTOR
Filed June 2, 1958 3 Sheets-Sheet 2
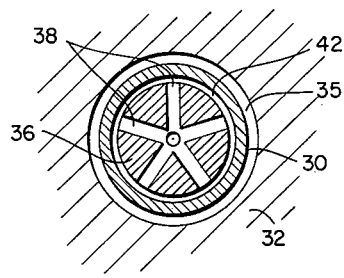
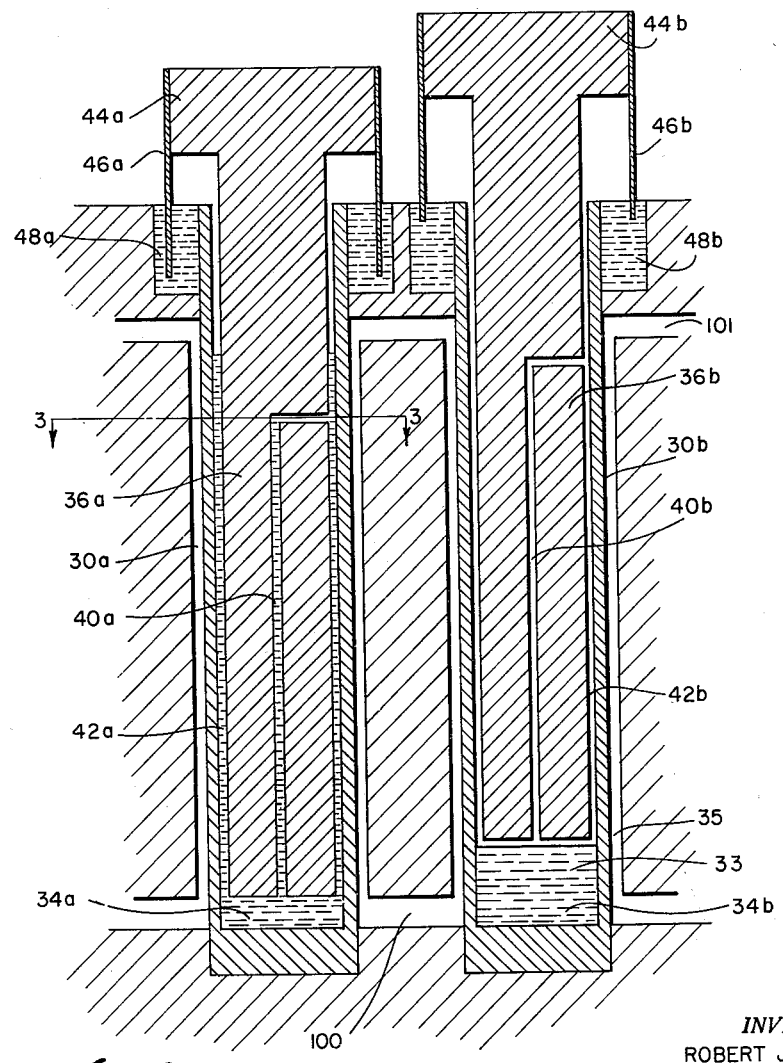
INVENTOR.
ROBERT J. TEITEL
BY United States Patent Office 2,999,060
Patented Sept. 5, 1961

2,999,060
CONTROL MEANS FOR A NUCLEAR REACTOR
Robert J. Teitel, Midland, Mich., assignor to the United States of America as represented by the United States Atomic Energy Commission
Filed June 2, 1958, Ser. No. 739,446
3 Claims. (Cl. 204—193.2)

The present invention relates to a novel means for establishing, maintaining and controlling a self-sustaining neutron chain fission reaction in a nuclear reactor. In particular it relates to an improved means for controlling the critical configuration in a nuclear reactor using a fluid nuclear fuel.

The nuclear art has developed to a point where nuclear reactors have been constructed and adapted to operate as sources of neutrons, as sources of power and for other purposes. Nuclear fuels already serve as a substitute for fossil fuels and it is contemplated that in some circumstances they will supplant fossil fuels as a source of power. While the general principles of nuclear reactor designs are well understood it is in the translation of these principles into practice that numerous difficulties are encountered. The present invention is directed to obviate some of the difficulties encountered in the use of fluid nuclear fuels and/or fluid control materials in a reactor in which they may be used.

Fluid nuclear fuels possess a number of advantages of solid nuclear fuel elements. In solid fuel elements, elemental uranium or one of its compounds is generally encased or clad in a metal jacket or ceramic jacket. A strong metallurgical bond between the uranium and its encasing material is generally required. The formed fuel elements must be so constructed as to maintain its mechanical integrity during reactor operation and also prevent fission products from diffusing through the cladding. After the solid fuel element has been used in a reactor for a period of time, it must undergo extensive processing to recover the unused uranium and/or fission products.

The use of fluid nuclear fuels reduces and in many cases does away with some of these problems. Involved fabrication techniques are not met and radiation damage problems which distort and warp the solid fuel elements are substantially eliminated. The chemical processing required to recover the unused uranium and some of the products of fission are not nearly as complex as in the processing of solid fuel elements.

While a number of advantages accrue from the use of fluid nuclear fuels several disadvantages are encountered. In cases where liquid slurries or dispersions are used extreme care must be exercised to control the fluidity of the slurry or dispersion within certain prescribed limits. Where fluid nuclear fuel materials are used in connection with a nuclear reactor, they are generally required to be pumped through an elaborate circulation system involving manifolds, pumps, seals and other apparatus. In pumping liquid fuel such as uranium (containing sufficient of the fissionable uranium-235) dissolved or dispersed in a liquid metal such as bismuth or lead-bismuth alloy, a number of major problems are involved. The circulation system must be absolutely leak-tight and the materials of construction must withstand the corrosive and erosive action encountered as a result of the use of such a fluid system. Special additives must be incorporated in the fluid composition to control the size, shape and rate of growth of the solid dispersed phase. See, for example, assignee's United States Patent 2,953,508, dated September 20, 1960. Corrosion inhibiting agents must be introduced in a nuclear fuel liquid composition so that a corrosion-resistant surface is maintained on the container walls through which the nuclear fuel flows (see, for example, assignee's United States Patents 2,910,379, dated October 27, 1959, and 2,926,111, dated February 23, 1960). Close control of the concentration of these additives and corrosion inhibitors in the fuel compositions are necessary. This involves elaborate process control techniques to insure that the concentration of these materials is maintained within closely required limits. For example, an insufficient amount of a corrosion inhibitor will, of course, be inoperative. Under these conditions mass transfer of the container material may occur from a hot zone of the system to a relatively cold zone and cause constriction of the fluid flow passages through which the nuclear fuel passes. An excess concentration of an additive may cause the entire character of the fluid fuel to change. For example, the additive may reduce the solubility of the nuclear fuel and thus change the physical character of the composition adversely.

These and other problems are a serious drawback to the efficient use of such a fluid fuel system in a nuclear reactor. It is therefore an object of my invention to utilize such a fluid nuclear fuel system in a nuclear reactor without the need of expensive and elaborate apparatus and to reduce the need for incorporating various corrosion and particle growth inhibiting additives in said system.

A principal object of the present invention is to provide a simple and reliable means for sustaining and controlling a neutron chain fission reaction in a nuclear reactor. Another object of the present invention is to provide a means of controlling the critical configuration of a reactor using a fluid containing a fissionable material. A further object of the invention is to provide a novel fuel element for use in a nuclear reactor. Still another object of the present invention is to provide a novel control rod for use in a nuclear reactor.

Other objects and advantages of the invention will be in part obvious and in part apparent from the description which follows taken in connection with the attached drawings wherein:

FIGURE 2 is a vertical sectional view of an embodiment of my invention showing the movable parts of the fuel element in alternative position and illustrates how the fluid nuclear fuel may be displaced from a subcritical configuration to a critical configuration and vice versa.

FIGURE 3 is a section taken along line 3—3 of FIGURE 2 and shows the connections forming a closed circulatory path through which the fluid fuel passes within a modified form of the fuel element.

Briefly my invention comprises a method and means for displacing a liquid fuel within the reactive core region of a nuclear reactor to regulate the distribution of nuclear fuel in said region and thus control the reactivity of said reactor. My invention further comprises a method and means for controlling the neutron flux of a reactor by providing means for displacing a volume of a liquid containing a neutron absorbing material into the reactive core region of a reactor to thereby regulate the neutron flux of said reactor.

Figure 1:
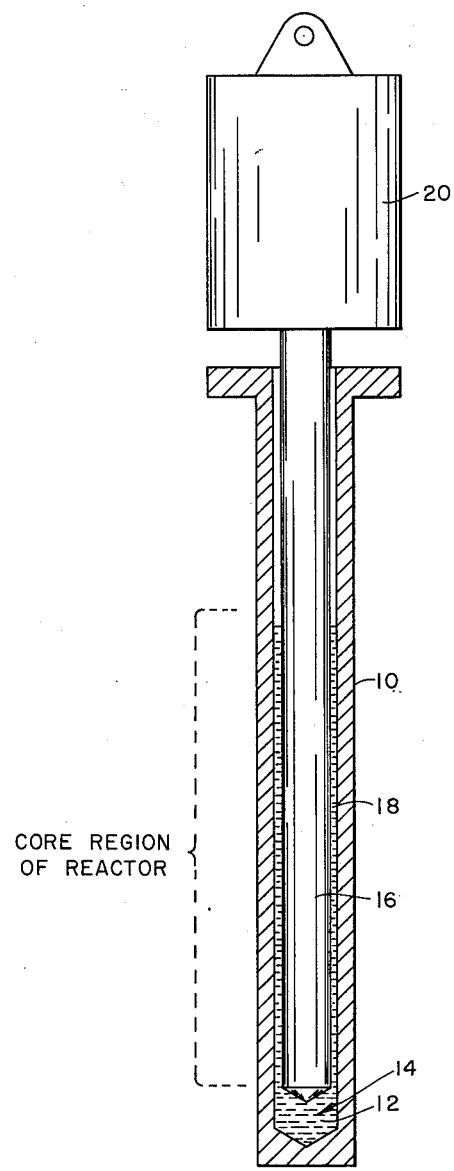
FIGURE 1 is a simplified vertical sectional view of a fuel element useful in carrying out the objects of my invention.

The objects and advantages of my invention may be realized by employing a fuel element as shown in FIGURE 1. It will be understood that the fuel element of my invention is useful in neutronic reactor systems employing a fissionable material such as uranium-235 or plutonium as the nuclear fuel wherein said fuel is dissolved or dispersed in a fluid medium. The fluid medium may be an aqueous solution or slurry, a fused salt or hydroxide, or a liquid metal such as sodium, sodium-potassium (NaK), bismuth or mixtures of liquid bismuth with a low melting metal such as tin and/or lead. The basic elements of a reactor in which my novel fuel element may be used are described in Nucleonics, volume 14, No. 4, pages 72 through 77 (April 1956), and in my United States Patent 2,910,417, dated October 27, 1959.

In the description of FIGURE 1, I refer to the liquid of the fuel element container as a nuclear fuel. Alternatively the liquid may comprise a nuclear poison, i.e. a material which has a high capture cross section for neutrons of thermal or intermediate energy. In the latter case control of a nuclear reactor occurs by absorption of neutrons by a material such as cadmium, boron, indium, mercury, uranium-238 or thorium. Referring to FIGURE 1, there is shown a fuel element comprising a cylindrical open-end container 10 which defines a well 12. The well 12 holds a liquid fuel composition indicated generally at 14. The container 10 should be constructed of a material which will withstand the necessary high temperatures which is corrosion resistant and which has the required nuclear properties; that is, it must be a material which has a low-capture cross section for thermal, intermediate, or fast energy neutrons. A material which satisfies these requirements to a considerable degree is graphite. Other materials which may be used include beryllium, zirconium, stainless steel and chromium-molybdenum steel alloys.

A rigid solid plunger 16 with a diameter slightly smaller than the internal diameter of well 12 fits coaxially into and is adapted to reciprocate within the well 12. A weight 20 is mounted on the upper end of plunger 16 in order to bias the plunger downwardly into the well. The combined mass of the plunger and weight will depend upon the density of the particular fluid within the well. The bracketed portion of FIGURE 1 indicates the part of the container which is located within the reactice core region of a nuclear reactor.

The internal wall of container 10 and the external surface of plunger 16 define an annulus 18. The annulus 18 is occupied by the fluid depending upon the relative location of plunger 16 within the well, as explained hereinafter. As shown in FIGURE 1, the tip of plunger 16 has a conical contour to allow for easy entry of the plunger into the liquid.

The operation of the above-described device is exceedingly simple. Assume that the plunger 16 is displaced to a position above the level of liquid in well 12. When it is desired to provide the core of the reactor with a volume of fuel, an actuator, not shown, such as a hydraulic piston, or a rack and pinion device, causes the weight 20 and the plunger 16 joined to it, to move downwardly in the well a predetermined distance to displace a volume of liquid into the annulus 18. There is formed, in effect, a variable-length fuel-bearing tube, and, in fact, the analogy is sufficiently accurate to permit the fuel elements to be treated as tubular fuel elements in reactor design calculations, the container 10 being analogous to a cladding material.

By utilizing a number of fuel assemblies such as described and shown in FIGURE 1, a sufficient mass and volume of a nuclear fuel may be displaced into the core region of a reactor to sustain a neutron chain fission reaction. The concentration of fissionable material within the fluid, the volume of each annulus and other parameters may be easily determined so that a critical configuration is attained within the reactor.

Thus by my invention, I am able to control the operation of a reactor utilizing a fluid fuel by displacing the fuel from a subcritical configuration to a critical configuration. In use, a number of fuel elements are positioned within the core region of the reactor, with the plungers 16 in withdrawn position. The necessary amount of fluid fuel for obtaining a critical configuration is in the wells of the individual fuel containers 10. When the plungers are actuated (moved downward into the liquid), discrete control of the critical configuration of the reactor may be accomplished by movement of the plungers either individually or in combination. Not only may the reactor be made critical, but the neutron flux distribution may readily be controlled. This is important, since, with a uniform distribution of nuclear fuel, the neutron flux is at a peak at the center and this in turn produces difficulties, the heat produced varying directly with the local neutron flux.

While I have described the operation of the device in terms of a nuclear fuel container, it will be apparent that the container may also hold a fluid containing a reactor poison material; that is, a material which will absorb neutrons and thus reduce the reactivity of the reactor. In this case, the operation of the device is the same, but the effect is different. That is, movement of the plunger downwardly into the liquid volume causes the fluid to be displaced into the annulus within the reactive core of the reactor and in this case, causes reduction of the neutron flux in the core.

In FIGURE 2, two adjacent fuel elements of identical construction are shown in position within a matrix of graphite serving as moderator in the reactor shown in FIGURE 4 to be described hereinafter. These fuel elements illustrate an embodiment of my invention whereby the fluid fuel may be continuously circulated within each fuel container. Referring to FIGURE 2, numerals 30a and 30b designate two cylindrical open-ended fuel containers within a graphite matrix 32 of the reactor. Coolant channels 35 are provided in the graphite matrix 32 in heat exchange relation with containers 30a and 30b, the coolant entering the channels from manifold 100, and leaving to manifold 101. The walls of each container define a well 34a and 34b which contain the liquid fuel 33 which may be uranium-235, uranium-233, or plutonium-239 dissolved or dispersed in any of the liquid media disclosed herein. Each well receives a plunger 36a and 36b. The plungers are of slightly smaller diameter than the wells so as to form therewith narrow annuli 42a and 42b. The lower portions of the plungers 36a and 36b have axial bores 40a and 40b extending the major length of the portion of the plungers within their respective wells. As shown in FIGURE 3, a plurality of radial channels or ports 38 is provided in each plunger communicating between the annuli 42a and 42b and axial bores 40a and 40b respectively to provide a closed circulatory path through which the fuel may flow.

The portion of the plungers exterior of containers 30a and 30b extends upwardly thereof and terminates in enlarged portions 44a and 44b respectively. An annular wall 46a and 46b surrounds and is sealed to the surface of the enlarged portions of the plungers. The walls extend downwardly into wells 48a and 48b formed in the graphite matrix. These wells are filled with a low melting, high boiling liquid metal, such as bismuth. The wall lengths are such as to insure that at least a portion thereof is immersed in the liquid metal filled wells 48, thus providing a hermetic seal for the annuli 42a and 42b. The portion of the annuli unoccupied by the fluid fuel may be pressurized with an inert gas to prevent oxidation of the fuel. A metal bellows can also be used in place of the liquid metal seal.

The operation of the fuel element in FIGURE 2 is similar to the one illustrated in FIGURE 1. Consider, in FIGURE 2, the plunger 36b in its retracted position; that is, out of contact with the fluid 33 resting at the bottom of well 34b. With the plunger in this position within a reactor, such as the one shown in FIGURE 4, the reactor is in subcritical condition; that is, the nuclear fuel and moderator are so arranged with respect to each other that the fuel will not sustain a fission chain reaction. Now consider, in FIGURE 2, the plunger immersed in the fluid fuel as shown in container 30a. In this position a portion of the fuel is displaced upwardly into the annulus 42a and into the axial bore 40a. With the fuel distributed in this position in the container, fuel is available in the reactive core portion of the reactor so that a critical configuration may be established. The heat of fission is removed by the coolant flowing in channels 35 in heat exchange relation with containers 30a and 30b. The transfer of heat to the coolant from the annulus 42a will take place at a greater rate than transfer of heat from the bore 40a. Hence a temperature differential will be set up between the bore 40a and the annulus 42a and, by thermal convection, the fluid fuel will be circulated within the container through bore 40a, radial ports 38 and through annulus 42a. This feature provides an increased measure of efficiency of heat removal from the reactor and prevents any localized hot areas from developing within the fluid fuel volume. Also in case the liquid fuel is a suspension, this circulation provides a certain amount of mixing to help in keeping the solids suspended.

Figure 4:
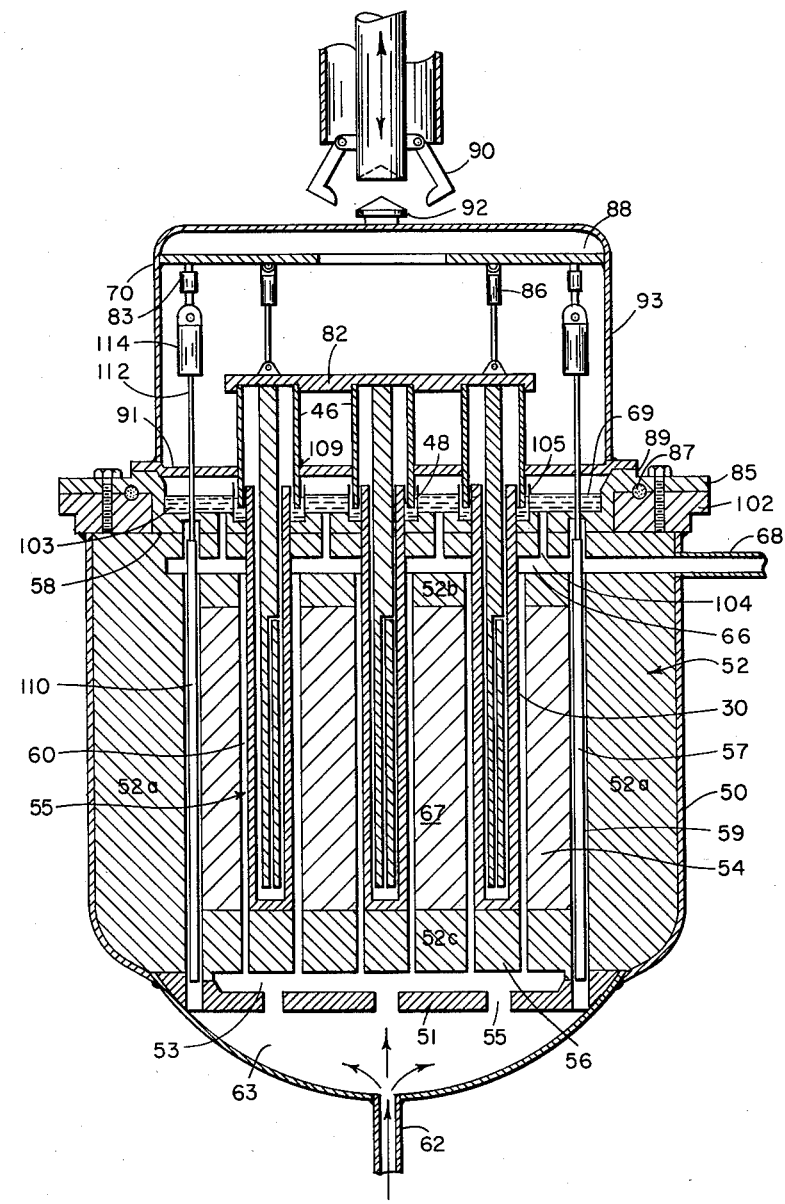
FIGURE 4 is a somewhat diagrammatic view mainly in section of a nuclear reactor showing the arrangement of the fuel elements within the reactor.

A representative nuclear reactor embodying the fuel element of my invention and which utilizes a liquid nuclear fuel and a liquid coolant is shown in FIGURE 4 and will only be briefly described, as in many respects it is similar to the design of the reactor described in my aforementioned copending application and the Nucleonics article previously referred to. A concrete vault, not shown, is provided which serves as a radiation shield in which the reactor is positioned.

The reactor is contained in a cylindrical pressure vessel 50, having a dished base and a lid assembly 70. The vessel and its lid are fabricated of a material which resists corrosion, for example, stainless steel or chrome-molybdenum steel. Within the vessel 50, the reactive core portion of the reactor is supported on a plate 51 seated in the dished end of the vessel. The plate 51 and the dished end of the vessel form an entrance manifold or plenum 63 for the coolant and, at the lowermost point of the vessel, there is a pipe 62 through which the coolant enters. The plate 51 is perforated as at 55 and serves as a baffle to distribute the coolant over the cross-section of the reactor.

At its upper end, the vessel 50 is provided with a flange 102 which supports a bowl-shaped plate 85 mounted in fluid-tight relation on the flange 102 by means of a gasket 87 and bolts 84 through a peripheral lip on the plate 85. At the inner edge of the flange 102 the seal plate 85 has an annular upward boss 89 to which lid assembly 70 is fastened. For clarity of illustration, the means necessary to seal the lid assembly 70 to the boss have been omitted from the drawing.

The lid assembly comprises a flanged plate 91 as a base, the flange being secured to the boss 89. At the inner end of the flange the plate 91 is hermetically sealed to a cup-shaped cover bell 93. The cover bell 93 and plate 91 define a chamber for containing the actuators for the fuel elements and reactor control rods and for containing an inert atmosphere. The reactive portion of the reactor is contained between the plate 85 and the lower support plate 51. The reactive portion comprises a central core region 67, generally cylindrical in shape and surrounded by a reflector region 52. The reflector, fabricated of a neutron moderator material, serves to reflect neutrons back into the core region and thus reduce neutron losses through the vessel wall. The reflector 52 comprises a cylindrical portion 52a between the central core region 67 and the vessel wall, an upper portion 52b between the core region and the well plate 85 and a lower portion 52c between the core region and the lower support plate 51. The lower portion 52c of the reflector 52 is spaced from the support plate 51 to facilitate the flow of coolant to the fuel elements. The upper portion 52b incorporates a coolant plenum or manifold 66 which communicates with a radial exit pipe 68 for removing coolant.

The core region 67 comprises a cylindrical moderator block 54 which may be fabricated of beryllium or graphite or other moderator material and may be constructed of blocks or bricks secured together in a unitary structure. Connecting the entrance plenum 63 and the exit plenum 66, continuous vertical channels 60 are disposed in spaced relation through the moderator block 54 and the upper and lower reflector portions 52b and 52c. The fuel elements are positioned within channels 60 and spaced from the channel walls to permit the flow of coolant. The fuel element containers 30 (compare FIGURE 2) are mounted in openings through plate 85 and upper reflector portion 52b. In an operating reactor of this type, there may be many fuel elements, but only a few are shown for the sake of clarity.

All of the open volume within the reactive portion outside the fuel containers and control rods is filled with coolant. The central area of the seal plate 85 is depressed downward toward the core region to form a shallow well 103. Ports 104 through the base of the well 103 and the uppermost end of upper reflector portion 52b communicate between the well 103 and the manifold 66 to permit the coolant to fill the well 103 partially, for example, to the level indicated at 69. Where the fuel elements pass through the plate 85, they are sealed to cups 105 whose upstanding walls extend above the level of the coolant in the well 103. The cups 105 serve to separate the coolant from the liquid fuel.

At spaced intervals around the periphery of the core region 67, control rods 57 are provided in coolant channels 59. The coolant channels, in a manner similar to the fuel element, communicate between the inlet plenum 63 and the outlet manifold 66.

The cover bell 93 and its base plate 91 define a chamber for containing the fuel element plunger actuators and the control rod actuators. The chamber is maintained in hermetically sealed condition in order to permit an inert gas atmosphere to be maintained in contact with the nuclear fuel and the coolant and thereby prevent their oxidation. The chamber may also collect at least part of the volatile fission products, such as xenon and krypton, and therefore it is desirable to maintain a continuous flow of inert gas through the chamber. While the fuel element plungers may have individual actuators, as shown in FIGURE 4 all of the plungers are attached to the single plate 82 from which the plungers depend. All of the plungers are reciprocated through movement of the plate 82. The plate 82 is, in turn, positioned by hydraulic piston actuators 86 which are mounted on a cross member 88 secured inside the bell 93. In a similar manner, the actuators 83 for the control rods are also mounted within the bell and the control rods extend through the plates 91 and 87 and into the control rod channels surrounding the core region of the reactor.

The sealing cylinders 46 (compare FIGURE 2) are also attached to the plate 82. The plate 91 has openings 109 through which the plungers and cylinders 46 pass. The cylinders 46 extend into the cups 105 where they are immersed in a liquid, as shown in FIGURE 2, serving to seal the fuel elements.

The control rods may be of the usual type, i.e., an alloy containing a neutron poison (such as a boron stainless steel), but preferably they are constructed in accordance with this invention using a liquid neutron-absorbing material in place of the fuel. In particular, each control rod 57 comprises a container 110 for the liquid neutron-absorbing medium and a plunger 112, substantially as described with reference to FIGURE 1. At its upper end, the plunger 112 is fastened to a heavy weight 114 which, in turn, is suspended from the actuator 83. The weight 114 provides a fail safe mechanism and permits the plunger 112 to be inserted rapidly into the neutron absorbing liquid should the actuator fail. Also, in using a hydraulic actuator, the actuator may be arranged so that the control rod plunger is driven downward by gravity simply by releasing the hydraulic pressure in the actuator. The presence of the weight 114 on a control rod mechanism distinguishes it from the fuel element assembly, as described with reference to FIGURE 2. In the fuel assembly the plunger is not weighted and the plunger is so designed that it tends to float in the liquid fuel. Accordingly the positive application of pressure is required to keep the plunger immersed in the fuel and thereby displace the fuel into the core region of the reactor. This again is an inherently safe mechanism. Should the pressure fail in the hydraulic actuators 86, the fuel element plungers will float upward causing the liquid fuel to drain from the core region of the reactor and render the reactor subcritical. Because of the arrangement of the fuel elements and of the control rods, the plungers are required to move less than one foot (six inches in the embodiment described below) and the force required is equivalent to dropping steel.

Because of its excellent properties, I prefer using graphite for the plungers and container. The fuel may be uranium-235 or 233 or plutonium-239 in a bismuth, a bismuth-lead or a bismuth-lead-tin solvent. It will be noted that fuel elements according to this invention resemble the common types of solid fuel elements now in use, e.g. tubes and rods. Accordingly, reactor design methods for these solid fuel elements are readily applicable to the present fuel elements.

Some alloys which are useful for the control rods are given in Table I.

TABLE I

*List of liquid metal reactor poison alloys*

| Composition, wt. percent | | | | | | Melting range or M.P., ° C. |
|---|---|---|---|---|---|---|
| Bi | Pb | Sn | Cd | In | Ga | |
| 32.7 | 7.5 | 16.7 | | 43.1 | | 58.8 |
| 49.5 | 17.6 | 11.6 | | 21.3 | | 58.2 |
| 49 | 18.7 | 11.3 | | 19.8 | | 58 |
| 44.7 | 22.6 | 8.3 | 5.3 | 19.1 | | 46.7 |
| 40.9 | 22.11 | 10.65 | 8.2 | 18.1 | | 46.5 |
| 40.63 | 21.9 | 10.55 | 8.0 | 17.95 | 0.98 | 41.5 |
| | | 12.5 | | 17.6 | 69.8 | 10.8 |
| | | 16 | | 21.5 | 62.5 | 10.7 |

It is notable that a control rod in accordance with this invention may be substituted with very simple modifications in many reactors, such as those using pressurized water, the only requirement being that they remain vertical. These control rods save substantial space at the top of such reactors because of their short stroke which is multiplied as the liquid is displaced into the annulus between the plunger and container.

Table II summarizes the characteristics of a reactor designed in accordance with this invention. In the table, the term "displacement factor" refers to the change in the level of the fuel as compared with the motion of the plunger, i.e., when the plunger is depressed one inch, the level of the fuel rises five inches. The other symbols and terms are those commonly used in reactor technology.

TABLE II

*Characteristics of liquid metal internally cooled test reactor*

Heat rate (megawatts) _____ 1–10.
Nuclear data:
    Critical mass (kg.) _____ 2.5–3.
    Total U–235 inventory (kg.) _. 3–3.5.
    Nuclear flux (neutrons/cm.$^2$ second) _____ $10^{13}$–$10^{14}$.
    $k_{eff}$ with plungers removed____ .5.
Compositions:
    Core—
        Fuel _____ 0.5–1% U—Bi solution.
        Moderator _____ Graphite.
        Coolant _____ Lead.
    Reflector _____ Graphite.
    Container _____ Chrome-molybdenum steel.

Dimensions:
    Core, right cylinder diameter and height (ft.) _____ 3.
    Reflector, thickness (ft.) _____ 1.5–2.
    Reactor vessel—
        Diameter (ft.) _____ 6–8.
        Height (ft.) _____ 10.
    Fuel element—
        Outside diameter (in.) ___ 3.
        Wall thickness (in.) _____ 3/8.
        Plunger outside diameter (in.) _____ 2.
        Displacement factor _____ Approx. 5.
        Number in core _____ 50–75.
        Plunger stroke (in.) _____ 6.
Thermal capability: Temperature range (° C.) _____ 325–1000.

In order to load the reactor, the lid assembly 70 together with the actuators and plungers mounted thereon is disengaged from vessel 50 and lifted up by a lift mechanism having a grapple 90 which engages a knob 92 mounted on the dome of bell 93. When the plungers have been removed, the fuel in containers 30 may be removed (as with a dip leg and gas pressure) and a quantity of fresh liquid or readily melted nuclear fuel pumped in. The lid assembly is then replaced and sealed to tank 50 by bolts 84 with the plungers positioned in the containers above the level of the alloy fuel. The solid fuel may be readily liquefied by circulating a liquid metal coolant such as liquid bismuth (or a hot gas such as helium) through the coolant passages surrounding each fuel element. The critical configuration of the reactor may then be controlled by adjusting the position of the plungers within the containers to displace the fluid fuel into the core of the reactor.

Since many embodiments might be made of the present invention and since many changes might be made in the embodiment described, it is to be understood that the foregoing description is to be interpreted as illustrative only and not in a limiting sense.

I claim:
1. In a nuclear reactor containing an active core region including a neutron moderator, means for controlling the critical configuration of said reactor comprising a plurality of vertically disposed, elongated tubular containers within said core region, a subcritical configuration of a liquid nuclear fuel filling a portion of said containers comprising a fissionable isotope selected from the group consisting of uranium 235, uranium 233, and plutonium 239 in a liquid bismuth solvent, and means for vertically displacing a portion of said liquid fuel in said containers to change the fuel configuration therein from subcritical to critical, said means comprising a cylindrical plunger within and coaxial of each container and defining therebetween an annulus, and means for reciprocating said plunger from a raised position out of contact with the liquid fuel in the container to maintain the reactor in a subcritical condition and a lowered position wherein the plunger displaces fuel vertically into the annulus to produce a critical configuration of the liquid fuel.

2. In a nuclear reactor containing an active core region including a neutron moderator, means for controlling the critical configuration of said reactor comprising a plurality of vertically disposed, elongated tubular containers within said core region, a subcritical configuration of a liquid nuclear fuel filling a portion of each container comprising a fissionable isotope selected from the group consisting of uranium 235, uranium 233, and plutonium 239 in a liquid bismuth solvent, and means for vertically displacing a portion of said liquid fuel in said containers to change the fuel configuration from subcritical to critical, said means comprising a cylindrical plunger within and coaxial of each container and defining therebetween an annulus, an axial bore in each plunger extending upwardly from its lower tip and in fluid communication with said annulus to define a closed circulatory path for said liquid fuel, and means for reciprocating said plunger within its container between a raised position out of contact with the liquid fuel in the container ot maintain the reactor in a subcritical condition and a lowered position wherein the plunger displaces liquid fuel vertically in the bore and annulus to produce a critical configuration of the liquid fuel.

3. In a nuclear reactor containing an active core region including a neutron moderator, fail-safe means for controlling the critical configuration of said reactor comprising a plurality of vertically disposed, elongated tubular containers within said core region, a subcritical configuration of a liquid metal fuel filling a portion of each container comprising a fissionable isotope selected from the group consisting of uranium 235, uranium 233 and plutonium 239 in a liquid bismuth solvent, and fail-safe means for vertically displacing a portion of said liquid metal fuel in said containers to change the fuel configuration from subcritical to critical, said means comprising a cylindrical graphite plunger within an coaxial of each container and defining therewith an annulus, an axial bore in each plunger extending upwardly from its lower tip and in fluid communication with said annulus to define a closed circulatory path for said liquid fuel, means for reciprocating said plunger within its container between a raised position out of contact with the liquid fuel in the container to maintain the reactor in a subcritical condition, and a lowered position wherein the plunger displaces liquid fuel vertically into the bore and annulus to produce a critical configuration in the liquid fuel, said graphite plunger being less dense than said liquid metal whereby upon failure of the reciprocating means the plunger will automatically rise in its container and the liquid fuel level therein will fall until the reactor becomes subcritical.

References Cited in the file of this patent

UNITED STATES PATENTS 2,735,811   Weinberg et al. _____ Feb. 21, 1956

FOREIGN PATENTS 132,646   Australia _____ May 17, 1949

OTHER REFERENCES

Nucleonics, vol. 13, February 1955, page 18.
Nuclear Science & Engineering, vol. 2, November 1957, page 806.